UNITED STATES PATENT OFFICE.

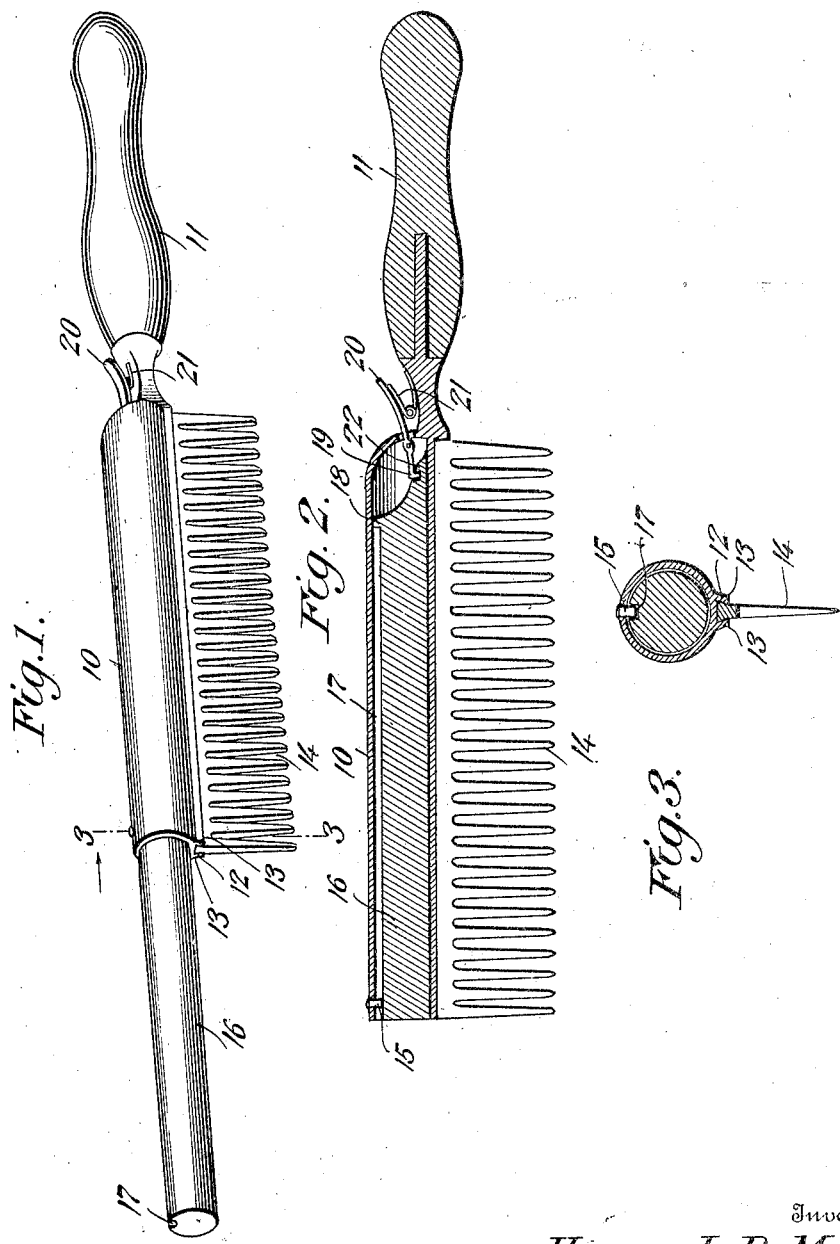

HERMAN L. DE MOND, OF PHILADELPHIA, PENNSYLVANIA.

COMB.

1,040,167.  Specification of Letters Patent.  Patented Oct. 1, 1912.

Application filed January 19, 1912. Serial No. 672,037.

*To all whom it may concern:*

Be it known that I, HERMAN L. DE MOND, a citizen of the United States, residing at Philadelphia, in the county of Philadelphia and State of Pennsylvania, have invented new and useful Improvements in Combs, of which the following is a specification.

The invention relates to combs and has for an object to provide a comb for drying the hair when the comb is passed therethrough.

The invention embodies among other features a comb body provided with a handle and having a casing formed thereon, the said casing being adapted to slidably receive a heating member with means for retaining the heating member in rigid engagement with the casing.

In the further disclosure of the invention, reference is to be had to the accompanying drawings constituting a part of this specification, in which similar characters of reference denote corresponding parts in all the views, and in which—

Figure 1 is a perspective view of my device, showing the heating member in extended position for heating. Fig. 2 is a vertical longitudinal sectional view showing the heating member within the casing. Fig. 3 is a transverse sectional view taken on the line 3—3 in Fig. 1.

Referring more particularly to the views, I provide a casing 10 having a handle 11 secured to one end thereof, the lower end of the said casing being provided with a recess 12, formed by depending flanges 13, having their inner sides inclined to slidably receive a comb body 14. The casing 10 is preferably tubular in shape and adjacent the open end thereof a depending pin 15 is mounted.

A heating member 16 is mounted to slide within the casing 10, the said heating member being provided with a longitudinally extending groove 17 in which is received a pin 15, a baffle plate 18 being formed at the rear end of the heating member 16, to extend across the groove, the said baffle being adapted to engage the pin 15 when the heating member 16 is moved into extended position, thus preventing the heating member from becoming entirely disengaged from the casing 10. At the rear end of the casing 10 a dog 19 is pivotally mounted, the said dog being provided with an integral handle 20, arranged exteriorly of the casing and adjacent the inner end of the handle 11, the said handle being engaged by a spring 21 adapted to normally retain the dog 19 in locked position. At the rear end of the heating member 16 an upwardly extending locking lug 22 is formed, a recess 23 being provided adjacent the locking lug 22 to receive an end of the dog 19. The locking lug 22 is preferably inclined so that the weight of the heating member will carry the same into engagement with the dog 19 as will be more fully described.

When it is desired to heat the heating member 16, the operator exerts a downward pressure on the handle 20, thus disengaging the dog 19 from the locking lug 22 and by holding the device downwardly at an incline, the heating member 16 will gravitationally slide into extended position as shown in Fig. 1. The heating member is now subjected to the heat of a lamp or the like and when the same has become suitably heated, the device is held upwardly at an incline, and the heating member by its weight, will gravitationally slide into the casing 10 and the end of the dog 19, passing over the inclined surface of the locking lug 22, will move into the recess 23 by the action of the spring 21, thus retaining the heating member in locked position within the casing 10. The heating member 16 is preferably provided with a lower flattened edge and the lower part of the casing is also slightly flattened to conform to the flattened edge of the heating member and this construction in addition to the pin 15 received in the groove 17, prevents any rotation of the heating member relatively to the casing.

I claim:—

1. A device of the class described comprising a casing, a handle for the casing, a comb body secured to the casing, a heating member slidably mounted within the said casing and means for limiting the outward movement of the heating member.

2. A device of the class described comprising a casing, a handle for the casing, a comb body secured to the casing, a heating member slidably mounted within the said casing, means for limiting the outward movement of the heating member and means for retaining the said heating member in locked position within the casing.

In testimony whereof I have affixed my signature in presence of two witnesses.

HERMAN L. DE MOND.

Witnesses:
    H. S. COHEN,
    PHOEBE COHEN.